Jan. 13, 1970     C. B. GENTRY     3,489,263

ARTICLE TRANSFER MECHANISM

Filed July 15, 1968     3 Sheets-Sheet 1

INVENTOR
CHARLES B. GENTRY

INVENTOR
CHARLES B. GENTRY

INVENTOR
CHARLES B. GENTRY

United States Patent Office 3,489,263
Patented Jan. 13, 1970

3,489,263
ARTICLE TRANSFER MECHANISM
Charles B. Gentry, Grand Rapids, Mich., assignor to Granco Equipment, Inc., Grand Rapids, Mich., a corporation of Delaware
Filed July 15, 1968, Ser. No. 744,825
Int. Cl. B65g 37/60
U.S. Cl. 198—89                                7 Claims

ABSTRACT OF THE DISCLOSURE

This disclosure relates to a transfer mechanism for articles such as elongated extrusion products. The transfer mechanism comprises first and second elongated U-shaped members with the second U-shaped member inverted relative to the first and having an article supporting surface fixed on the top thereof. The second U-shaped member has side walls spaced to fit within the side walls of the first U-shaped member. Juxtaposed grooves are formed in the side walls between each U-shaped member and ball bearings are positioned within the grooves between the two U-shaped members to support for relatively frictionless movement the upper second U-shaped member on the first U-shaped member. Means, such as a chain attached to the underside of the upper U-shaped member and a sprocket wheel, are disclosed for moving the upper U-shaped member relative to the first U-shaped member. Means are also disclosed for lifting one or both ends of the first lower U-shaped member so that the upper U-shaped member can be positioned beneath the extrusion products to lift them, carry them laterally, and deposit them on a second supporting surface.

---

This invention relates to article transfer mechanisms. In one of its aspects, it relates to an article transfer mechanism for elongated extruded products in which an inverted U-shaped contacting member is longitudinally slidable within an upright lower U-shaped member by virtue of juxtaposed grooves in the side walls of the U-shaped member, which grooves contain ball bearings for sliding of one U-shaped member relative to the other.

In my co-pending patent application, Ser. No. 686,647, filed Nov. 29, 1967, now U.S. Patent 3,455,433, there is disclosed and claimed a transfer mechanism in which a lifting member is rotatably supported for rotation about a transverse axis and a longitudinal contacting member is positioned for longitudinal reciprocation on the lifting member. A chain, attached to the contacting member, engages a sprocket wheel to actuate the reciprocatory movement. Bearing means are positioned between the contacting member and the lifting member for relatively frictionless movement between the two members.

I have now discovered that, within the same broad concept, the above described structure can be greatly simplified by employing an elongated inverted U-shaped member for the lifting member, an elongated upright U-shaped member shaped so that one of the U-shaped members fits within the other, and providing juxtaposed grooves in the side walls of the U-shaped members for ball bearings which provide relatively frictionless sliding of the upper U-shaped member on the lower U-shaped member.

By various aspects of this invention one or more of the following, or other, objects can be obtained.

It is an object of this invention to provide an improved transfer assembly which is inexpensive to construct and can be easily and rapidly assembled.

It is a further object of this invention to provide a strong inexpensive and highly functional walking beam assembly which is formed of inexpensively manufactured parts.

It is yet another object of this invention to provide an apparatus for lifting elongated extrusion products from a slatted conveyor system wherein the tolerances required for effective operation are relatively large and yet the power required is relatively small.

Other aspects, objects, and the several advantages of this invention are apparent to one skilled in the art from a study of this disclosure, the drawings, and the appended claims.

According to the invention, there is provided an article transfer mechanism having a slide assembly comprising a first elongated U-shaped member and a second elongated U-shaped member, inverted relative to the first elongated U-shaped member. The side walls of one of the first and second U-shaped members are spaced closer than the side walls of the other U-shaped member so as to fit between the other side walls with a small space therebetween. Outwardly facing grooves are formed in the side walls of the one U-shaped member and inwardly facing grooves are formed in the side walls of the other of the U-shaped members in juxtaposition relative to the outwardly facing grooves in the one U-shaped member. Ball bearing members are positioned within the grooves in the side walls of the first and second U-shaped members so as to permit relatively frictionless movement of the first U-shaped member relative to the second U-shaped member with the first U-shaped member supporting the second U-shaped member.

An article supporting surface is positioned on top of the second U-shaped member for supporting articles on the slide assembly. Means are further provided for actuating reciprocatory movement of the second U-shaped member relative to the first U-shaped member.

The slide assembly can be used for a lift-off mechanism such as disclosed in my copending Ser. No. 686,647 or can be used in a walking beam assembly.

The invention will now be described with reference to the accompanying drawings in which.

Figure 1:
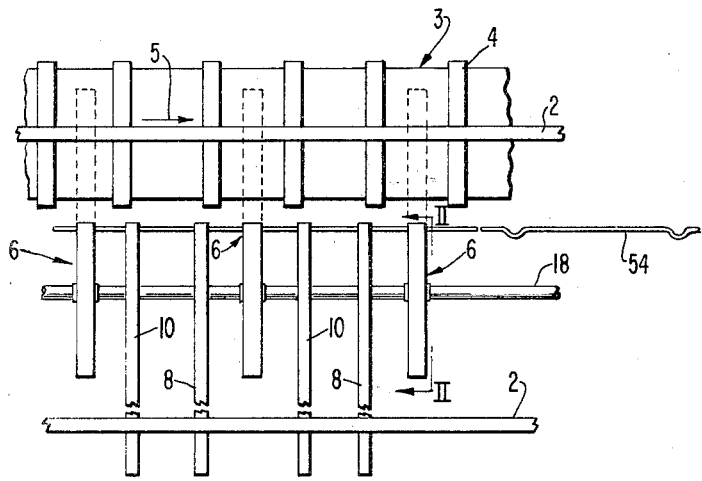
FIG. 1 is a plan view of an extrusion run-out system embodying the invention.

Referring now to FIGS. 1 through 4, an extrusion product 2 is conveyed by a conveyor system 3 having a plurality of upstanding slats 4 in a direction shown by arrow 5. When the extrusion product 2 has reached a predetermined position on the conveyor 4, the conveyor stops and a plurality of lift-off and transfer mechanisms 6 extend over to the dotted line position shown in FIG. 1 and are positioned beneath the extruded product 2. The end of the lift-off and transfer mechanism 6 is then raised to lift the extruded product off from the conveyor slats 4. The lift-off and transfer mechanism then carries the extruded product 2 onto walking beam members 8 and 10 for transferring to other areas for further processing.

Figure 2:
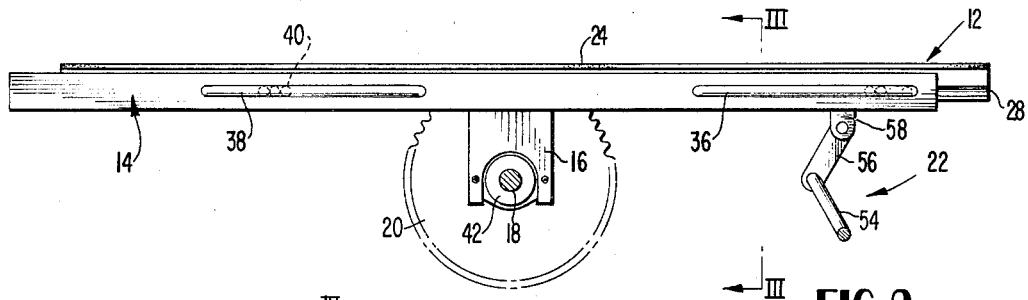
FIG. 2 is a side elevational view seen along lines II—II of FIG. 1.
Figure 3:
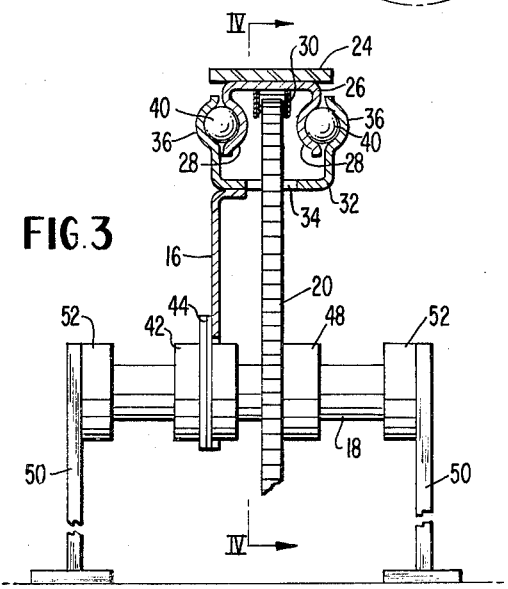
FIG. 3 is an elevational sectional view taken along lines III—III of FIG. 2.

As seen more clearly in FIGS. 2 and 3, the lift-off and transfer mechanism comprises a contacting member 12 which is horizontally slidable within a lifting member 14. The lifting member is supported by a flange 16, which in turn is rotatably supported on shaft 18. A sprocket wheel 20, fixed to shaft 18, actuates the horizontal movement of contacting member 12. A lifting crank assembly 22 is provided to periodically lift one end of the lifting member 14 so that the contacting member 12 can lift the extrusion product 2 from the conveyor slats 4 and transfer them to the walking beam members 8 and 10.

The contacting member 12 has an upper contacting bar 24 supporting the extrusion product 2. The bar 24 is preferably made from a non-abrasive, non-marring material such as Eelslip. Other materials such as solid carbon can be used.

The contacting bar 24 is attached to the upper side of an inverted U-shaped member 26. A chain 30 is attached to the underside of the U-shaped member 26 for engaging sprocket wheel 20. The chain 30 can be welded at either end to the member 26 so that a small amount of slack is provided in the chain 30. A pair of outwardly facing grooves 28 are provided along the length of the depending legs or sides of the inverted U-shaped member 26.

The lifting member 14 comprises an upright U-shaped member 32 whose side walls are spaced slightly farther apart than those of the inverted U-shaped member 26. Inwardly facing grooves 36 and 38 are provided in each upstanding side of the U-shaped member 32. The grooves 36 and 38 are spaced longitudinally along the length of the U-shaped member 32 in juxtaposition to the groove 28 of the inverted U-shaped member 26. A ball bearing 40 is positioned between each groove 28 on the inverted U-shaped member 26 and the grooves 36 and 38 on the U-shaped member 32. The length of grooves 36 and 38 determines the distance of travel of the contacting member 12 relative to lifting member 14.

Figure 3A:
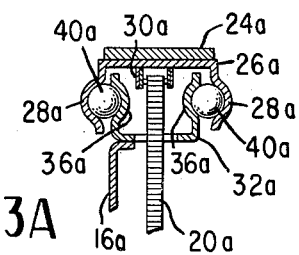
FIG. 3a is a view like FIG. 3 of a modified form of the invention.

As seen in FIG. 3a, the inverted U-shaped member can have side walls spaced so as to be farther apart than the side walls of the upright U-shaped member. In FIG. 3a, like numerals with the suffix a have been used to describe like parts. Referring specifically to FIG. 3a, the inverted U-shaped member 26a has side walls spaced so as to be on the outside of the side walls of upright U-shaped member 32a. Groove 28a of the inverted U-shaped member 26a face inwardly and grooves 36a of the upright U-shaped member face outwardly. Ball bearing 40a are positioned within the grooves 28a and 36a to provide relatively frictionless movement between the two U-shaped members 26a and 32a.

The contacting bar 24 extends out over the edge of inverted U-shaped member 26 and over the adjoining area between members 26 and 32 so as to minimize dirt or scale falling between the members 26 and 32. The inclusion of dirt or scale between the members 26 and 32 will hinder the relatively frictionless movement of member 26 relative to U-shaped member 32.

The supporting flange 16 is welded to one side of the bottom of U-shaped member 32. This flange 16 is connected to a bearing 42 through plates 44 and suitable attaching means such as bolts or welding to provide a rotatable support of plate 16 on shaft 18.

The sprocket wheel 20 extends through a slot 34 in the bottom of U-shaped member 32 and engages chain 30. The sprocket wheel 20 is attached to a collar 48 which in turn is fixed to shaft 18 through a set screw.

Supporting members 50 are attached to bearing members 52 to rotatably support shaft 18 a sufficient distance above the floor to permit the sprocket wheel 20 to rotate without contacting the floor.

The lifting crank assembly comprises a crankshaft 54 which is rotatably attached to a linkage 56 which in turn is rotatably attached to a flange 58. The bottom of the U-shaped member 32 is securely fastened to the flange 58. As the crankshaft 54 rotates about its central axis, the right end of the lifting member 14 will be raised and lowered.

Reference is now made to FIGS. 1 through 5 for a description of the operation of the lift-off and transfer mechanism. When the extruded products 2 are properly positioned on the conveyor 4, the crank 54 will lower the lifting member to its lowest position (not shown) then, the sprocket wheel 20 will be turned by shaft 18 to move the contacting member 12 to the dotted line position shown in FIG. 1 and to a position illustrated in FIG. 5. The sprocket wheel 20 engages the chain 30 to move the contacting member 12. With the contacting bar 24 properly positioned beneath the extrusion product 2, the crank 54 is rotated to the position shown in FIG. 5. This causes the contacting member 12 to be raised at the right end portion thereof, pivoting about central shaft 18. The right end of contacting bar 24 will lift the extruded products upwardly from the conveyor slats 4. With the right end of the lifting member 14 and the right end of contacting member 12 raised, the sprocket wheel 20 is rotated in a counterclockwise position to cause the contacting member 12 to move to the left when viewed in FIGS. 4 and 5. When the contacting member 12 has reached a retracted position, the crank 54 will be rotated to lower the right end of contacting member 12 so that the extrusion product 2 will then be positioned on the walking beam members 8 and 10. The walking beam members then transfer the hot extrusion product 2 away from the conveyor belt 3 to a position illustrated by the lower extrusion product 2 in FIG. 1.

Figure 6:
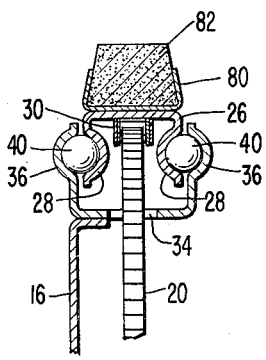
FIG. 6 is a sectional view like FIG. 3 showing a modified form of the invention.

The embodiment illustrated in FIG. 6 is the same as that illustrated with regard to FIGS. 1 through 5, except that the contacting bar 24 has been replaced by a trapezoidally shaped graphite bar 82 which is held in place by a channel member 80 whose side flanges generally conform to the side wall shape of the graphite bar 82. The channel member 80 can be welded to the inverted U-shaped member 26. The operation of the embodiment shown in FIG. 6 is exactly the same as that shown in the embodiment of FIGS. 1 through 5.

Figure 7:
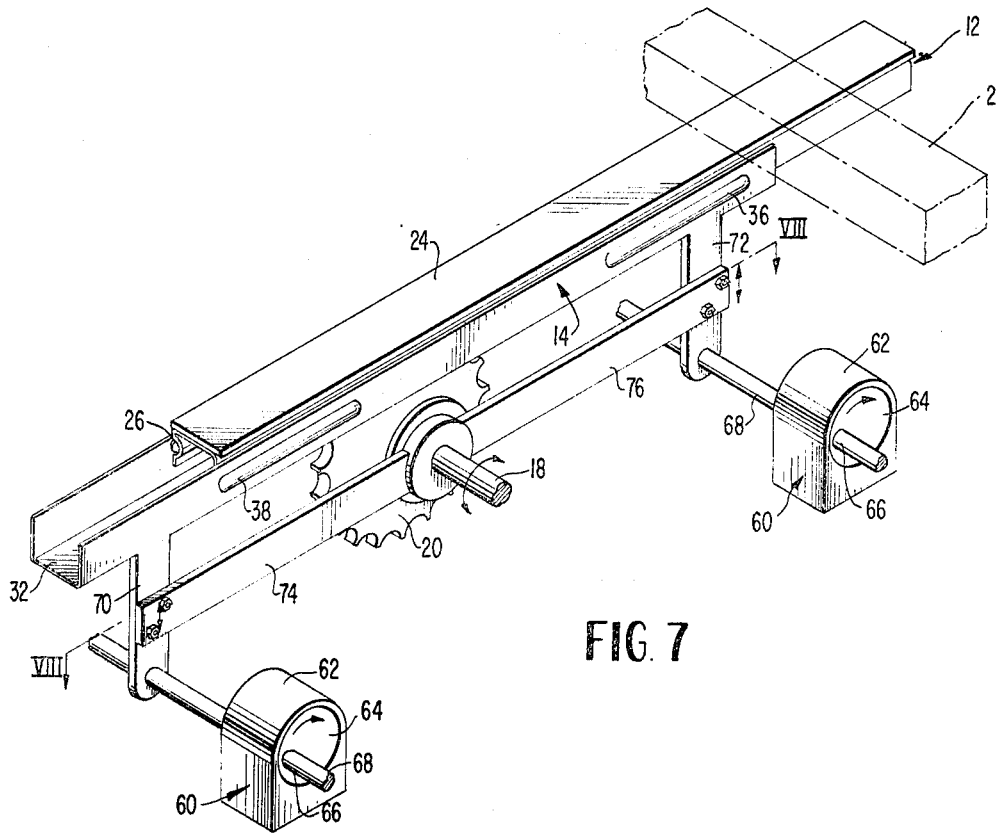
FIG. 7 is a perspective view of one member of a walking beam embodying the invention.
Figure 8:
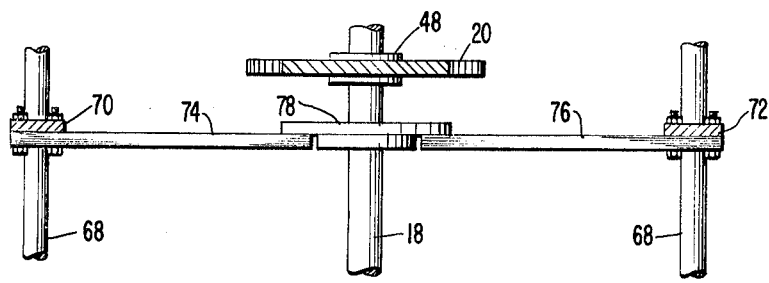
FIG. 8 is a plan sectional view seen along lines VIII—VIII of FIG. 7.

Referring now to FIGS. 7 and 8, there is shown a schematic representation of the use of the invention in a walking beam assembly. In this embodiment, like numerals have been used to illustrate like parts. In particular, the upper portion of the walking beam assembly is identical to that shown in FIGS. 1 through 5. The contacting member 12 has a contacting bar 24 and an inverted U-shaped member 26 having longitudinal outwardly facing grooves 28. A holding or lifting member 14 has an upright U-shaped channel 32 having inwardly facing grooves 36 and 38 for cooperating with the grooves 28 of the inverted U-shaped member 26. Ball bearing members (not shown) are positioned between the grooves 36 and 38 on the lifting or supporting member 14 and the groove 28 on the inverted U-shaped member 26 in the same fashion as has been shown in FIG. 3.

Figure 4:
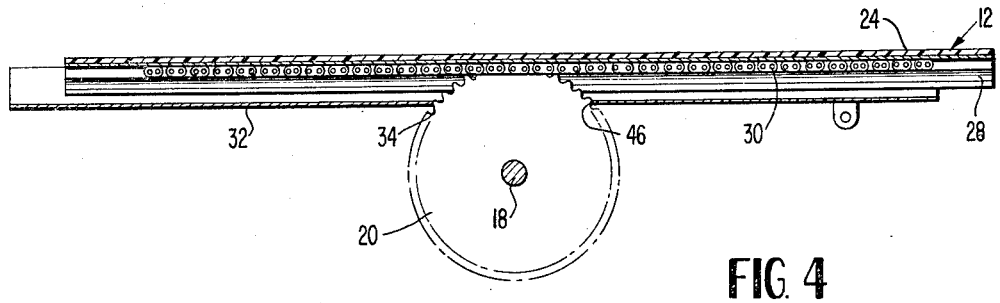
FIG. 4 is a view taken along lines IV—IV of FIG. 3.
Figure 5:
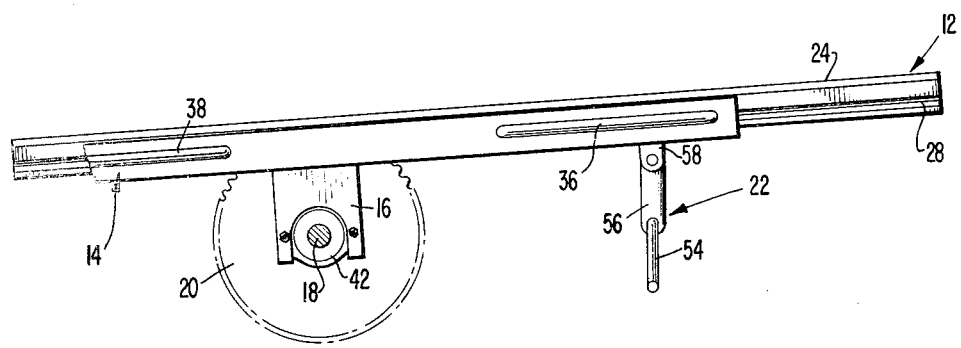
FIG. 5 is a view similar to FIG. 2 showing the contacting member raised and in extended position.

A sprocket wheel 20 attached to shaft 18 actuates the reciprocatory movement of contacting member 12 within the lifting member 14. A chain such as illustrated in FIGS. 3 and 4 is fixed at the ends thereof to the underside of U-shaped member 26. The sprocket wheel 20 engages the chain for movement of the contacting member 12.

Lifting bearings 60 have housing 62 with a circular bearing aperture therein. A cylindrical bearing cylinder 64 is rotatably supported within the bearing housing 62. A hole 66 is provided eccentrically within cylindrical shaft 64 for the positioning of rod 68. As the cylindrical shaft 64 rotates about a central point, the eccentrically mounted shaft 68 will be raised and lowered relative to a floor level.

The shafts 68 are rotatably connected to vertical supports 70 and 72 which, in turn, are rigidly attached to the bottom of U-shaped member 32. In this manner, the lifting member 14 is periodically raised and lowered.

Horizontal cross members 74 and 75 are rigidly attached to the vertical supports 70 and 72 respectively, and support the central shaft 18 through a bearing plate 78. The horizontal cross members 74 and 76 can be welded to the bearing plate 78 which rotatably supports the central shaft 18.

In operation, the device illustrated in FIGS. 7 and 8 can be used in conjunction with a stationary member or with another member, similar to that shown in FIGS. 7 and 8, and mounted on separate shafts like 68 and 18. If used with a stationary member, the stationary member would have a longitudinal contacting surface positioned above the floor intermediate the distance between the upper and lower positions of contacting bar 24 to permit the contacting bar 24 to be positioned beneath the article resting on the stationary member, lift the article, and transfer it to a different position. A bar, such as 2, is positioned across a plurality of devices like that shown in FIGS. 7 and 8 and the shaft 68 is rotated until it reaches the top position within the lifting bearing 60. At this point, the sprocket wheel 20 rotates, to the right to transfer the bar in that direction. The shafts 68 are then rotated again until they reach the bottom position within the lifting bearing 60 so that the bar 2 on the contacting members 24 will be supported by the stationary or other walking beam members. The sprocket wheel is then rotated counter clockwise as seen in FIG. 7, until the contacting member 12 returns to the original position. This process can be repeated to continue to transfer the members to the right or to the left, as desired.

In the operation of the device shown in FIGS. 7 and 8, the means for rotating the shaft 18 would have to be mounted with respect to bars 60 so that the actuation means for central shaft 18 would be raised and lowered with that shaft.

The novel slide assembly finds extensive utility in high temperature operations. The assembly requires no lubrication and therefore can be used in those operations in which lubrication between moving parts is difficult or impossible to maintain.

Whereas the invention has been described with relation to a particular embodiment or embodiments, it is to be understood that the invention can take forms different than those specifically shown and described. Various modifications will be suggested to those skilled in the art without departing from the scope of the invention, which is defined by the appended claims.

The embodiments of the invention in which an exclusive property or privilege is claimed are defined as follows.

1. An article transfer mechanism for use in moving elongated metal articles comprising:
 a support member;
 a slide assembly having a first elongated U-shaped member mounted on said support member, and a second elongated U-shaped member inverted relative to the first U-shaped member, the side walls of said second U-shaped member being either spaced closer than or farther apart than the side walls of said first U-shaped member so that the side walls of one of said U-shaped members fit between the side walls of the other U-shaped member with a small space therebetween;
 outwardly facing grooves in the side walls of said one U-shaped member;
 inwardly facing grooves on the side walls of said other of said U-shaped members in juxtaposition to said outwardly facing grooves of said one-U-shaped member;
 ball bearing members within the grooves in said side walls of said first and second U-shaped members permitting relatively frictionless movement of said second U-shaped member relative to said first U-shaped member with said first U-shaped member supporting said second U-shaped member;
 an article supporting surface positioned on the top of said second U-shaped member for supporting articles on said slide assembly;
 means for actuating reciprocatory movement of said second U-shaped member relative to said first U-shaped member said actuating means including a chain, having its ends secured to said second U-shaped member, and a sprocket engaging said chain; and
 means for supplying rotation power to said sprocket to cause movement of said second U-shaped members relative to said first U-shaped member.

2. The article transfer assembly according to claim 1 wherein said support member comprises a central rotatable shaft, said first U-shaped member is rotatably supported on said central shaft; and said sprocket is fixed to said central shaft and engaging said chain, and said central shaft being rotatable about a longitudinal axis to cause reciprocatory movement of said second U-shaped member.

3. The article transfer assembly according to claim 1 wherein means are provided to periodically raise only one end of said first U-shaped member thereby causing said first U-shaped member to rotate about said support member.

4. The article transfer assembly of claim 1 wherein said support member comprises a central shaft rotatable about its longitudinal axis, means are provided to raise both ends of said first U-shaped member and said central shaft in unison so as to raise said assembly and maintain said sprocket in contact with said chain to permit movement of said second U-shaped member relative to said first U-shaped member independent of said raising means.

5. A walking beam assembly comprising:
 a plurality of aligned article transfer assemblies as defined in claim 4;
 and a plurality of stationary members positioned between said article transfer assemblies, each stationary member having an article supporting surface positioned at a height intermediate between the lower and highest positions of said second U-shaped member as it is raised and lowered by said raising means.

6. The article transfer assembly according to claim 2 wherein said second U-shaped member fits within said first U-shaped member, said grooves in said second U-shaped member run substantially the length of the side walls of said U-shaped member, said grooves in said first U-shaped member comprise a pair of axially aligned spaced grooves in each side wall, one of said grooves being on each side of said central shaft.

7. The article transfer assembly of claim 6 wherein said article supporting member is a flat bar member which extends on either side of said first U-shaped member so as to overlie the opening between said first and second U-shaped member wherein dirt accumulation between said side walls is minimized.

References Cited

UNITED STATES PATENTS

| | | | |
|---|---|---|---|
| 1,106,992 | 8/1914 | Thomas | 16—88 |
| 1,848,898 | 3/1932 | McFarland | 214—26 |
| 1,936,840 | 11/1933 | Inscho | 214—26 |
| 2,805,106 | 9/1957 | Penkala | 312—341 |

RICHARD E. AEGERTER, Primary Examiner

U.S. Cl. X.R.

198—218; 214—26